United States Patent Office 3,159,650
Patented Dec. 1, 1964

3,159,650
TRIETHYLENETETRAMINE TETRASCORBATE AND ITS PREPARATION
Julius Diamond, Decatur, Ill., assignor to Lincoln Laboratories, Inc., Decatur, Ill., a corporation of Indiana
No Drawing. Filed May 23, 1962, Ser. No. 196,911
2 Claims. (Cl. 260—343.7)

This application relates to lyophilized triethylenetetramine tetrascorbate as a new composition of matter especially useful in administering massive doses of ascorbic acid (vitamin C) through intramuscular injections. The invention also relates to a preferred method of preparing the foregoing compound in lyophilized form.

The clinical use of ascorbic acid (vitamin C) in various nutritional deficiencies and infectious diseases is classical. While this vitamin is routinely administered orally, it is subject to a high eprcentage of destruction in the gastrointestinal tract. Therefore, it is often given parenterally for more certain clinical effects.

In treating many conditions massive doses of ascorbic acid are required and the vitamin is frequently administered in concentrations as high as 500 mg. per cc. It is therefore advantageous to employ a highly water soluble form of ascorbic acid but heretofore the most soluble form commercially available has been sodium ascorbate. However, it is necessary to prepare an almost saturated aqueous solution of this salt (at 25° C.) in order to obtain an ascorbic acid equivalent of 500 mg./cc. Accordingly, the need for a more highly water soluble therapeutic form of ascorbic acid has long been apparent.

It has been discovered in accordance with the present invention that triethylenetetramine tetrascorbate in the form of lyophilized powder provides a greatly improved source of ascorbic acid for parenteral injection being characterized by: (1) its ability to form parenteral solutions having an unusually high concentration of ascorbic acid (e.g. 700 mg./cc.) and a molar ratio of ascorbic acid to amine of 4:1; (2) its ability to form a high percentage of acceptable plugs in vials (e.g. 95% acceptable plugs containing the equivalent of 2 grams of ascorbic acid in 20 ml. vials); and, (3) its excellent stability in this form.

The object of the invention, generally stated, is the provision of an improved therapeutic form of ascorbic acid and method of making the same and this objective is very satisfactorily satisfied by lyophilized triethylenetetramine tetrascorbate and the hereinafter disclosed method of preparation.

For a more complete understanding of the nature and scope of the invention, reference may be had to the following detailed description thereof.

The following table gives a numercial comparison between the water-solubility of triethylenetetramine tetrascorbate and three commercially available forms of ascorbic acid:

TABLE 1

| | Ascorbic Acid Content, Percent | Solubility in Water at 25° C., gm./ml. $H_2O$ | Ascorbic Acid Equivalent Solubility in Water at 25° C., gm./ml. $H_2O$ |
|---|---|---|---|
| Triethylenetetramine Tetrascorbate | 82.75 | >1.73 | >1.43 |
| Sodium Ascorbate | 88.8 | 0.83 | 0.74 |
| Calcium (Bis-) Ascorbate | 89.6 | 0.40 | 0.36 |
| Ascorbic Acid | 100.0 | 0.33 | 0.33 |

The foregoing table shows that the water solubility of triethylenetetramine tetrascorbate at 25° C., is 108% greater than that of sodium ascorbate, 330% greater than that of calcium ascorbate, and 425% greater that of ascorbic cid. Even more significant are the values which appear in the last column of the table. These values represent the ascorbic acid equivalent solubility per ml. of water at 25° C. for each compound and are obtained by multiplying the first two values in each line of the chart. It will be seen that the value for triethylenetetramine tetrascorbate greatly exceeds that of the three commercially available forms of ascorbic acid being 93% greater than that for sodium ascorbate, 300% greater than that for calcium ascorbate, and 330% greater than that for ascorbic acid. Hence, it will be apparent that triethylenetetramine tetrascorbate can be used as a source of ascorbic acid in much greater concentrations than has previously been possible. However, aqueous solutions of this compound are extremely unstable and they begin to discolor within one day at room temperature.

The following example sets forth a preferred method of preparing triethylenetetramine tetrascorbate in the form of lyophilized powder.

*Example*

For 1000 vials each containing 2.0 gms. ascorbic acid equivalent:

Ascorbic acid _____gms__ 2200
Triethylenetetramine _____gms__ 457
Water for injection, q.s. _____liters__ 15

The ascorbic acid is incompletely dissolved in 7.5 liters of water for injection maintained at 0° to 5° C. A second solution is prepared by dissolving the triethylenetetramine in 2 liters of water for injection. The second solution is added slowly to the first solution while stirring under nitrogen at 0° to 5° C. The pH of the resultant solution is 4.0 to 5.0. After the addition is completed the stirring is continued for 15 minutes. The volume of the solution is adjusted to 15 liters with water for injection.

The final solution is passed through a sterile 0.015 porosity bacteriological filter. To each vial is added exactly 15 ml. of solution under aseptic conditions. The solution is frozen at about —40° C. while the vials are slowly rotated to expose the greatest surface area of the solution. Under aseptic conditions, the material is freeze-dried for 48 hours at 25 microns without applying external heat. The vials are then transferred to a second vacuum chamber where the material is aseptically freeze-dried an additional 48 hours over phosphorous pentoxide. When the process is completed, the vacuum chamber is vented with dry nitrogen, and the vials are removed aseptically and capped.

Lyophilized triethylenetetramine tetrascorbate occurs as a stable, white powder which is highly soluble in water (>1.73 gm. per ml. $H_2O$ at 25° C.) forming non-viscous aqueous solutions of pH 4.0 to 5.0. The lyophilized product is stable for many months at room temperature and practically indefinitely when refrigerated.

Analysis for $H_2N(CH_2CH_2NH)_3H \cdot 4C_6H_8O_3$:

| | Calc'd, % | Found, % |
|---|---|---|
| $H_2N(CH_2CH_2NH)_3H$ | 17.25 | 15.95 |
| $C_6H_8O_6$ | 82.75 | 81.92 |

Triethylenetetramine tetrascorbate yields a much higher percentage of acceptable plugs than its homologs as shown by the following table.

LYOPHILIZATION [1] OF AQUEOUS SOLUTIONS OF POLYALKYLENEAMINE POLYASCORBATES

| | Vial Size, cc. | Yield of Acceptable Plugs on Lyophilization, Percent | Stability of Plug | | | Solubility of Plug in 1.5 ml. of water at 70° F. (Final concn. approx. 700 mg. vit. C per cc.) |
|---|---|---|---|---|---|---|
| | | | 36° F. | 70° F. | 98° F. | |
| Ethylenediamine Bis-Ascorbate (EDAC) | 20 / 50 | 0 / 55 | Good after 1 yr | Good for 2–3 mo | Poor | Complete. |
| Diethylenetriamine Tris-Ascorbate (DETAC) | 20 / 50 | 25 / 92 | Good after 1 yr | Poor / Good for 3–4 mo | Poor / do | Complete. |
| Triethylenetetramine Tetr-Ascorbate (TETAC) | 20 / 50 | 95 / — | Good after 1 yr | Good for 4–5 mo | Poor | Complete. |
| Tetraethylenepentamine Pent-Ascorbate (TEPAC) | 20 / 50 | 50 / 100 | Good after 1 yr / do | Good for 3–4 mo / Good for 4–5 mo | Poor / do | Complete. / Complete. |

[1] Lyophilization conditions: Each vial contains the equivalent of 2 gms. Vitamin C; freeze-dried in vacuo 48 hrs. followed by additional 48 hrs. freeze drying in vacuo over $P_2O_5$.

Since the lyophilized material has to be reconstituted with water to give a solution volume of only 2–3 ml. for intramuscular injection, it is obviously desirable to use the smallest vial possible and only triethylenetetramine tetrascorbate gave a satisfactory yield of plugs for the 20 cc. vials.

This application is a continuation-in-part of my prior co-pending application Serial No. 33,122, filed June 1, 1960, now abandoned.

Having fully disclosed the invention and set forth a preferred working example thereof, what is claimed as new is:

1. Lyophilized triethylenetetramine tetrascorbate.
2. The method of making lyophilized triethylenetetramine tetrascorbate which comprises, incompletely dissolving about 4.8 parts of ascorbic acid in about 21 parts of water maintained from 0° C. to about 5° C., dissolving 1 part of triethylenetetramine in about 5.6 parts of water, slowly blending the second solution in the first under nitrogen while maintaining the temperature at 0° C. to about 5° C., adding about 15.5 parts of water to the resulting blend, passing the final solution through a bacteriological filter, and lyophilizing the filtered solution.

References Cited in the file of this patent

UNITED STATES PATENTS

| 2,132,622 | Volwiler et al. | Oct. 11, 1938 |
| 2,570,734 | Walti | Oct. 9, 1951 |
| 2,767,177 | Erickson | Oct. 16, 1956 |

FOREIGN PATENTS

| 809,239 | Great Britain | Feb. 18, 1959 |

OTHER REFERENCES

Runti: Chemical Abstracts, vol. 49 (1954), page 1427a.